Dec. 15, 1942.   F. PORSCHE   2,305,305
CHASSIS FOR POWER VEHICLES
Filed June 13, 1940
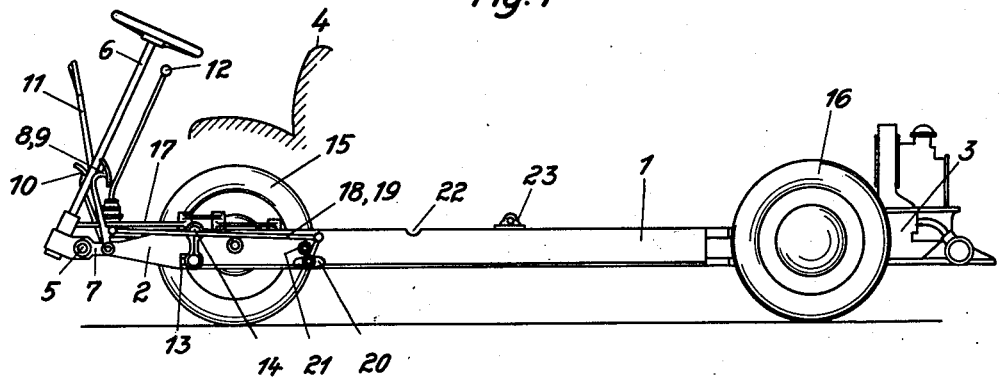
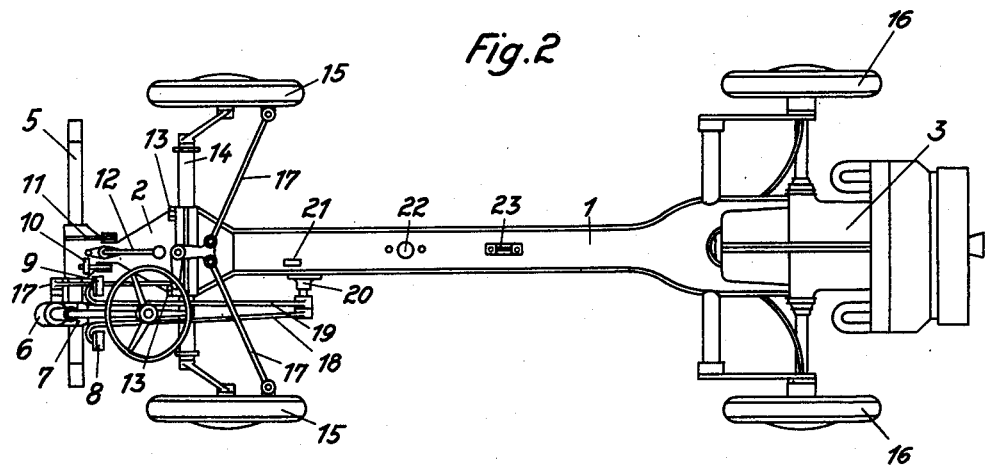
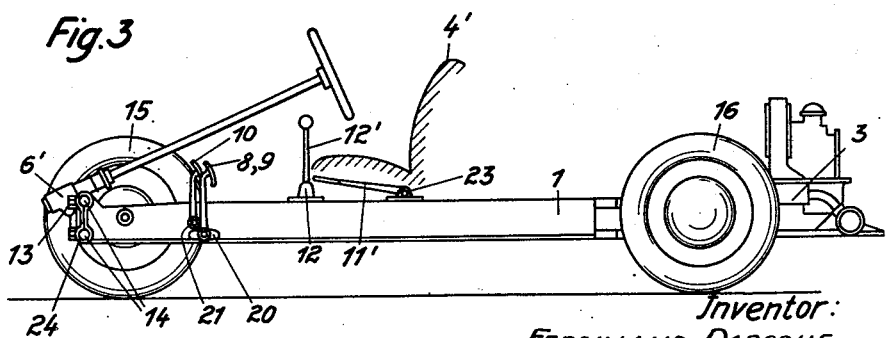
Inventor:
FERDINAND PORSCHE
ATTORNEYS Patented Dec. 15, 1942

2,305,305

UNITED STATES PATENT OFFICE 2,305,305

CHASSIS FOR POWER VEHICLES

Ferdinand Porsche, Stuttgart, Germany; vested in the Alien Property Custodian

Application June 13, 1940, Serial No. 340,282
In Germany April 29, 1939

9 Claims. (Cl. 180—54)

This invention relates to a chassis for power vehicles, and more particularly to one which is adapted for use with various types of vehicles.

An object of this invention is to provide a vehicle chassis which produces a maximum amount of loading surface.

Another object of this invention is to provide a convertible chassis which may be used in connection with various types of vehicle bodies.

A further object of this invention is to provide a simple and inexpensive arrangement for quickly and easily converting an ordinary vehicle chassis into a chassis in which the driver's seat is positioned as far forwardly as possible, leaving a large area of useful load surface.

A more specific object of this invention is to provide a two-part vehicle chassis, the rear part of which serves to hold the vehicle driving unit and forms the load carrying part of the vehicle, while the forward part contains all of the vehicle control levers and pedals.

These and other features of the invention will be best understood and appreciated from the following description of a preferred embodiment thereof, described for purposes of illustration and shown in the accompanying drawing, in which:

Fig. 1 is a side view of a two-part chassis formed in accordance with the present invention, the left front wheel having been removed to better show the relationship between the various parts;

Fig. 2 is a plan view of the complete two-part chassis; and

Fig. 3 is a side view of a vehicle chassis utilizing only one part of the two-part chassis illustrated in Figs. 1 and 2.

The preferred form of this invention as illustrated in Figs. 1 and 2, shows a chassis of the type adapted to be used for delivery wagons and trucks, i. e., a chassis having a maximum amount of useful load area, and consisting of a main central generally tubular frame part 1 and a supplemental frame part 2. The frame part 1 is adapted to support the vehicle driving unit 3, preferably at its extreme rear end, while on the other hand the driver's seat 4 is positioned as far forwardly as possible, leaving between the driving unit 3 and the driver's seat 4 a large useful load-carrying area. The front part 2 of the chassis may be provided at its forward end with a transverse frame member such as the transverse tube 5, which is adapted to support the vehicle body (not shown) or a driver's cab (not shown) by any suitable means well known in the art. The steering unit 6 is also supported on the transverse tube 5, while the clutch pedal 8 and the brake pedal 9 are attached to the tube 5 by means of a suitable journal bushing 7. The gasoline pedal 10, the hand brake lever 11 and the gear shift lever 12 are directly mounted upon the main portion of the front chassis section 2.

The two frame parts 1 and 2 may be connected with one another by means of bolts 13, and preferably hold between them two transverse tubes 14 which, in a manner well known in the art, may include torsion rods for the springing of the front wheels 15, guided in the ends of the tubes by means of link parallelograms. The rear wheels 16 are preferably mounted on pivoted half axles, guided by swinging struts and sprung by torsion rods connected with them, mounted in the transverse tubes. It is pointed out, however, that the specific details of the suspension form no part of the present invention, and are to be more or less generally found, for example, in the U. S. Patent to Rabe et al., 2,133,633, dated October 18, 1938.

The interconnection between the various control members mounted on the forward part 2 of the chassis, and the member to be controlled, may take place partially inside or partially outside of the chassis itself. For example, the steering linkage 17 is mounted wholly outside of both chassis parts. On the other hand, the links 18 and 19 respectively connected with the pedals 8 and 9 may be pivoted to cranks journaled in a bushing 20 on the rear chassis portion, from whence the actual control of the clutch and brake will be effected by members (not shown) extending within the tubular frame part 1. The linkages for the gasoline pedal 10, the hand brake lever 11 and the gear shift lever 12 will extend wholly within the two frame parts 1 and 2.

The adaptability of the chassis illustrated in Figs. 1 and 2 to the ordinary type of vehicle in which the driver's seat is positioned substantially rearwardly of the front end of the chassis, for example, in passenger vehicles, is illustrated in Fig. 3. In this case only the chassis section 1 is used, the forward chassis portion 2 being dispensed with. In this case, the clutch and foot brake pedals 8 and 9 are directly connected in the bearing blocks 20. The gasoline pedal 10 is mounted on an appropriate bearing eye 21, provided on the frame portion 1. The frame portion 1 is also provided with an appropriate cut-out portion 22 adapted to receive the gear-shift lever 12', and also provided with a bearing member 23 to receive the hand-brake lever 11'. The forwardly extending part of the steering linkage 17 is removed, and the steering gear 6' is now mounted above the transverse tubes 14. The tubes 14 are now held onto the chassis section 1 by means of an appropriate shell member 24, attached thereto by means of the bolts 13. It will accordingly be seen that in Fig. 3, all of the necessary control members such as the steering mechanism 6', clutch and foot brake pedals 8 and 9, gasoline pedal 10, hand-brake lever 11' and gear shift lever 12' are all grouped together so as to be controllable by the driver sitting in the seat 4'. With respect to the clutch and foot brake pedals 8, 9 it is to be noted that in changing from the form shown in Figs. 1 and 2 to that in Fig. 3, it is merely necessary to remove the linkages 18, 19 and place the pedals upon the shafts to which these linkages were previously connected. On the other hand, it will be necessary to make revisions of the controlling linkages inside the chassis section 1, for the gasoline pedal and the hand brake and gear-shift lever. These changes can be accomplished in any manner known to those skilled in this art, and form no part of the present invention in their detail.

In changing from the type of vehicle frame illustrated in Figs. 1 and 2 to that in Fig. 3, no change is necessary with respect to the driving unit 3 or the rear wheels 16. It is possible, however, that the loading of the vehicle will be altered to such an extent that the size of the torsion rods used in the rear wheels suspension should be changed and/or it may be advisable to alter the transmission ratio of the rear wheel drive.

Certain changes which will be obvious to those skilled in this art can be effected without modifying the principles of the present invention. For example, in the form of chassis illustrated in Figs. 1 and 2, the driver's seat may be moved still further forwardly if the chassis portion 2 is made correspondingly longer. This is possible because in accordance with the design of the present invention, the loading on the chassis section 2 is in all cases relatively small.

The invention additionally, is not limited to a vehicle in which the engine is mounted at the rear end of the chassis section 1. Obviously, the engine might be mounted at the front end of the chassis section 1 behind or between the front wheels. Furthermore, while an air-cooled engine is of advantage in the construction shown, it is clear that a water-cooled engine might also be used, in which case the transverse tubular member 5 is particularly well adapted to support the necessary radiator.

Accordingly, it will be seen that I have provided a construction which satisfies the objects enumerated above, and while I have shown the invention in a certain physical embodiment, it is to be understood that modifications of the structure shown may be made by those skilled in this art without departing from my invention as expressed in the following claims.

I claim:

1. In a vehicle, a frame comprising a first longitudinally extending rigid member and a second smaller rigid member, rear wheels for said vehicle, means for mounting said rear wheels substantially at one end of said first frame member, dirigible front wheels for said vehicle, means for supporting said dirigible wheels, means for attaching one end of said second frame member to the other end of said first frame member and simultaneously mounting said dirigible wheel supporting means between said two frame members, and means for controlling said vehicle including means for steering said dirigible wheels, mounted on said second frame member.

2. The combination according to claim 1, in combination with a driving engine for said vehicle mounted on said first frame member, and in which said vehicle control means includes means for controlling said engine.

3. The combination according to claim 1, in which the means for supporting said dirigible wheels includes a pair of transverse tubes and swinging levers journaled at one end at the ends of said tubes and pivotally connected at their other ends to said wheels, in combination with torsion springs mounted in said tubes to resist movement of said levers.

4. The combination according to claim 1, in which said second frame member includes a transverse tubular beam, in combination with means for mounting said steering means on said tubular beam.

5. In a vehicle, a main frame, an engine mounted on said frame, rear wheels connected to one end of said frame, dirigible front wheels, means for supporting said dirigible front wheels, a supplemental frame, common releasable means for clamping said supplemental frame and said supporting means to the front end of said main frame, clutch and foot-brake pedals, means for co-axially journalling said pedals on said supplemental frame, a gas pedal, means for pivotally connecting said gas pedal on said supplemental frame, a hand-brake lever, means for pivotally connecting said hand-brake lever on said supplemental frame, a gear-shift lever, means for mounting said gear-shift lever on said supplemental frame, and steering means including a linkage for said dirigible wheels mounted on said supplemental frame.

6. The combination according to claim 5, in combination with foot-brake and clutch-actuating co-axial shafts on said main frame adapted to respectively receive foot-brake and clutch pedals, and linkage means operatively connecting the foot-brake and clutch pedals on said supplemental frame with the corresponding shafts on said main frame.

7. The combination according to claim 5, in which said supplemental frame includes a transverse tubular beam upon which said foot-brake and clutch pedals and said steering means are mounted.

8. The combination according to claim 5, in which said main frame includes means for co-axially journalling the clutch and foot-brake pedals, means for pivotally supporting a gas pedal, means for pivotally supporting a hand-brake lever, and means for mounting a gear-shift lever, whereby the pedals and levers on the supplemental frame may be transferred to their respective mountings on the main frame and said vehicle may be controlled from said main frame irrespective of the presence or absence of said supplemental frame.

9. In a vehicle, a two-part transversely divided chassis, releasable means for interconnecting the two parts of said chassis, rear wheels mounted on the rear part of said chassis, dirigible front wheels pivotally interconnected with said chassis, a driving engine mounted on the rear part of said chassis, means for controlling said vehicle including means for controlling the driving engine and means for controlling said dirigible wheels all mounted on the front part of said chassis, and means on the rear part of said chassis adapted to receive the vehicle controlling means mounted on the front part of said chassis, whereby the rear part of said chassis may form a complete controllable vehicle upon removal of its front part by release of said interconnecting means.

FERDINAND PORSCHE.